(12) United States Patent
Shimada et al.

(10) Patent No.: US 12,307,754 B2
(45) Date of Patent: May 20, 2025

(54) INFORMATION PROCESSING SYSTEM AND LEARNING METHOD FOR MIRROR SURFACE REGION IDENTIFICATION

(71) Applicant: SONY GROUP CORPORATION, Tokyo (JP)

(72) Inventors: Daiki Shimada, Tokyo (JP); Tokuhiro Nishikawa, Tokyo (JP); Tatsuhito Sato, Tokyo (JP)

(73) Assignee: TOKYO GROUP CORPORATION, Tokyo (JP)

( * ) Notice: Subject to any disclaimer, the term of this patent is extended or adjusted under 35 U.S.C. 154(b) by 380 days.

(21) Appl. No.: 17/756,472

(22) PCT Filed: Nov. 27, 2020

(86) PCT No.: PCT/JP2020/044270
§ 371 (c)(1),
(2) Date: May 25, 2022

(87) PCT Pub. No.: WO2021/112009
PCT Pub. Date: Jun. 10, 2021

(65) Prior Publication Data
US 2022/0415034 A1 Dec. 29, 2022

(30) Foreign Application Priority Data
Dec. 6, 2019 (JP) .................. 2019-220913

(51) Int. Cl.
*G06V 10/82* (2022.01)
*G06T 7/215* (2017.01)
*G06V 10/77* (2022.01)

(52) U.S. Cl.
CPC ............. *G06V 10/82* (2022.01); *G06T 7/215* (2017.01); *G06V 10/7715* (2022.01); *G06T 2207/20084* (2013.01)

(58) Field of Classification Search
USPC ........................................................ 382/155
See application file for complete search history.

(56) References Cited

U.S. PATENT DOCUMENTS

2013/0242102 A1    9/2013  Tsuchiya et al.

FOREIGN PATENT DOCUMENTS

CN    103348394 A    10/2013
EP    2698778 A1    2/2014
(Continued)

OTHER PUBLICATIONS

Uchiha (Year: 2016).*
(Continued)

*Primary Examiner* — Jacky X Zheng
(74) *Attorney, Agent, or Firm* — CHIP LAW GROUP

(57) ABSTRACT

An information processing system (1) includes an operation amount data acquisition unit (109), an image data acquisition unit (101), a difference expression extraction unit (108), and a mirror surface region identification unit (111). The operation amount data acquisition unit (109) acquires operation amount data of an object. The image data acquisition unit (101) acquires image data captured by an imaging device mounted on the object. The difference expression extraction unit (108) extracts a difference expression representing feature information about a difference between two images based on two pieces of image data captured before and after the operation of the object. The mirror surface region identification unit (111) identifies a mirror surface region based on a correlation between the difference expression and the operation amount data.

11 Claims, 12 Drawing Sheets

(56) References Cited

FOREIGN PATENT DOCUMENTS

| | | | |
|---|---|---|---|
| JP | 11-203446 A | | 7/1999 |
| JP | 2016072924 A | * | 5/2016 |
| JP | 2018142154 A | * | 9/2018 |
| MX | 2013008808 A | | 10/2013 |
| RU | 2013132011 A | | 5/2015 |
| WO | 2012/141219 A1 | | 10/2012 |

OTHER PUBLICATIONS

Honda (Year: 2018).*
"Region Identification Technique for Mirror Surface/Transparent Object", Toshiba Review, vol. 68, No. 10, 2013.
International Search Report and Written Opinion of PCT Application No. PCT/JP2020/044270, issued on Feb. 2, 2021, 08 pages of ISRWO.

* cited by examiner

INFORMATION PROCESSING SYSTEM AND LEARNING METHOD FOR MIRROR SURFACE REGION IDENTIFICATION

CROSS REFERENCE TO RELATED APPLICATIONS

This application is a U.S. National Phase of International Patent Application No. PCT/JP2020/044270 filed on Nov. 27, 2020, which claims priority benefit of Japanese Patent Application No. JP 2019-220913 filed in the Japan Patent Office on Dec. 6, 2019. Each of the above-referenced applications is hereby incorporated herein by reference in its entirety.

FIELD

The present invention relates to an information processing system and a learning method.

BACKGROUND

In object detection using a vision sensor, an object reflected in a mirror is also detected in the same manner as the others. Therefore, it is difficult to recognize the mirror itself. Non Patent Literature 1 proposes a technique in which a predetermined pattern moving in a certain direction is captured by a video, and a region where the same pattern moves in a different direction is extracted and identified as a mirror surface region.

CITATION LIST

Non Patent Literature

Non Patent Literature 1: "REGION IDENTIFICATION TECHNIQUE FOR MIRROR SURFACE/TRANSPARENT OBJECT", Toshiba Review Vol. 68 No, 10 (2013)

SUMMARY

Technical Problem

However, in the above-described conventional technique, when another pattern showing similar motion exists in the imaging region, there is a possibility that the detection region of the pattern is erroneously recognized as the mirror surface region.

Therefore, the present disclosure proposes an information processing system capable of accurately detecting a mirror surface region and a learning method of a neural network that performs the information processing.

Solution to Problem

According to the present disclosure, an information processing system is provided that comprises: an operation amount data acquisition unit that acquires operation amount data of an object; an image data acquisition unit that acquires image data captured by an imaging device mounted on the object; a difference expression extraction unit that extracts, based on two pieces of image data captured before and after an operation of the object, a difference expression representing feature information about a difference between the two pieces of image data; and a mirror surface region identification unit that identifies a mirror surface region based on a correlation between the difference expression and the operation amount data.

According to the present disclosure, a learning method executed by a computer is provided, the method comprises a learning process using learning image data of a stationary object at a plurality of times, wherein the learning process includes generating a restoration expression of learning image data at a time $t_1$, inputting learning image data at a time $t_q$ where q is an integer of two or more and a restoration expression of learning image data at a time $t_{q-1}$ immediately before the time $t_q$ to a difference encoder to extract an extended difference expression at the time $t_q$, inputting the extended difference expression at the time $t_q$ to a correction unit to perform correction to rewrite a portion of a tensor representing the extended difference expression at the time $t_q$ to zero, adding a restoration expression of the learning image data at the time $t_{q-1}$ and noise to the extended difference expression at the time $t_q$ after the correction to generate a restoration expression of the learning image data at the time $t_q$, decoding the restoration expression of the learning image data at the time $t_q$ by an image decoder to generate restored image data at the time $t_q$, calculating a restoration error between the restored image data at the time $t_q$ and the learning image data at the time $t_q$, and repeating adjusting a weight of a neural network representing the image encoder, the difference encoder, the correction unit, and the image decoder until the restoration error satisfies a predetermined criterion.

DESCRIPTION OF EMBODIMENTS

Hereinafter, the embodiments of the present disclosure will be described in detail with reference to the drawings. In the following embodiments, the same parts are denoted by the same reference signs, and a duplicate description will be omitted.

Note that the description will be given in the following order.

[1. Configuration of information processing system]
[2. Description of method of extracting mirror surface region]
[3. Configuration of learning system]
[4. Description of learning method]
[5. Application example 1 of information processing system]
[6. Application example 2 of information processing system]
[7. Effects]

1. Configuration of Information Processing System

Figure 1:
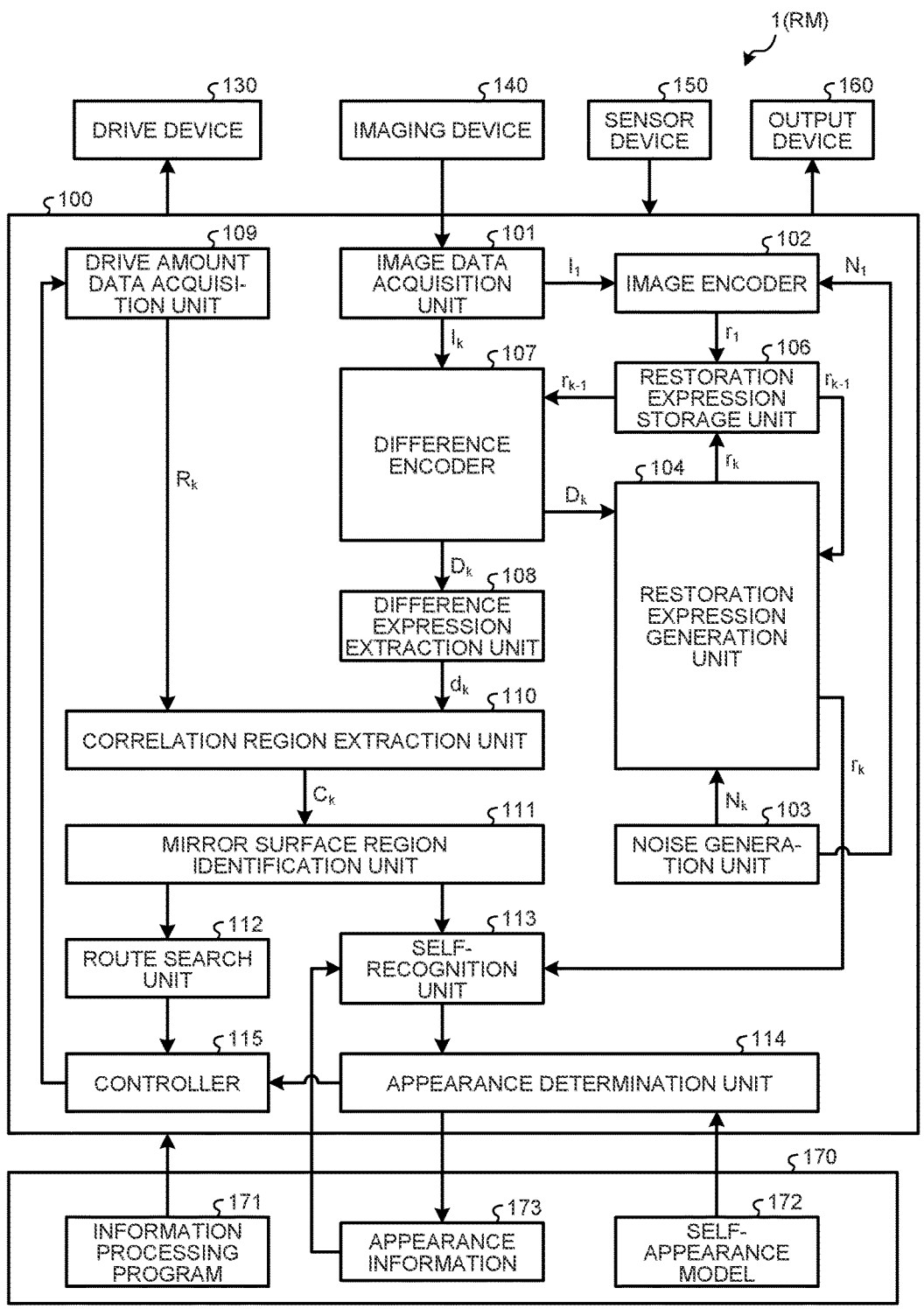
FIG. 1 is a schematic diagram illustrating an example of an information processing system.

FIG. 1 is a schematic diagram illustrating an example of an information processing system 1. An information processing system 1 is mounted on, for example, a robot RM (see FIGS. 10 and 11) that is an autonomous mobile object OB.

The information processing system 1 includes, for example, a processing device 100, a drive device 130, an imaging device 140, a sensor device 150, an output device 160, and a storage device 170.

For example, the processing device 100 extracts a mirror surface region MA (see FIG. 3) from the front image data captured by the imaging device 140. The processing device 100 executes various kinds of control based on, for example, a position of the mirror surface region MA and feature information included in the mirror surface region MA.

The drive device 130 drives a plurality of motors MT (see FIGS. 10 and 11) mounted on the robot RM based on a drive signal input from a controller 115. The robot RM incorporates a plurality of motors MT. The motor MT is, for example, a stepping motor. The drive device 130 supplies a pulse signal to each of the plurality of motors MT to cause the robot RM to execute various operations.

The imaging device 140 is mounted on the robot RM and captures an image around the robot RM. The imaging device 140 is mounted on, for example, an eye portion of the robot RM, and captures an image in front of the robot RM. The imaging device 140 includes an image sensor such as a charge coupled device image sensor (CCD), or a complementary metal oxide semiconductor (CMOS). The imaging unit 140 converts the video into a signal to output the signal to the processing device 100.

The sensor device 150 includes one or more sensors mounted on the robot RM. Examples of the sensor included in the sensor device 150 include an acceleration sensor, an angular velocity sensor, an orientation sensor, a magnetic sensor, a proximity sensor, an illuminance sensor, a sound sensor, an atmospheric pressure sensor, a temperature sensor, a humidity sensor, a pressure sensor, and a global positioning system (GPS) sensor.

The output device 160 includes one or more output devices that output various types of information obtained by the processing device 100. Examples of the output device include a display device and an audio output device. Examples of the display device include a liquid crystal display (LCD) and an organic light emitting diode (OLED). An example of the audio output device includes a speaker.

The processing device 100 includes, for example, an image data acquisition unit 101, an image encoder 102, a noise generation unit 103, a restoration expression generation unit 104, a restoration expression storage unit 106, a difference encoder 107, a difference expression extraction unit 108, a drive amount data acquisition unit 109, an correlation region extraction unit 110, a mirror surface region identification unit 111, a route search unit 112, a self-recognition unit 113, an appearance determination unit 114, and the controller 115.

The image data acquisition unit 101 acquires image data I captured by the imaging device 140. The image data acquisition unit 101 acquires, for example, image data I at a plurality of times from a time $t_1$ to a time $t_T$, where T is an integer of two or more in chronological order based on a video signal input from the imaging device 140. The image data acquisition unit 101 performs preprocessing such as noise removal on the video signal input from the imaging device 140 as necessary. The image data acquisition unit 101 outputs the image data I at the plurality of times to the image encoder 102 or the difference encoder 107 in chronological order.

Hereinafter, in a case where the image data I at each time is distinguished, a suffix indicating the time is added to the reference numeral I. In a case where data at each time calculated in relation to the image data I is distinguished, a suffix indicating the time is also added to a code indicating the data. The same applies to the description of a learning device to be described later.

The noise generation unit 103 generates noise N at a plurality of times from the time $t_1$ to the time $t_T$. The noise N is, for example, Gaussian noise or salt-and-pepper noise. The noise generation unit 103 outputs the noise N at the plurality of times to the image encoder 102 or the restoration expression generation unit 104 in chronological order.

The image encoder 102 encodes the image data $I_1$ at the time $t_1$ to extract an internal expression (sometimes referred to as latent expression or feature expression) of the image data $I_1$ at the time $t_1$. The image encoder 102 generates a restoration expression $r_1$ of the image data $I_1$ at the time $t_1$ by adding the noise $N_1$ to the internal expression of the image data $I_1$ at the time $t_1$. The restoration expression $r_1$ is a tensor having two dimensions or more. The restoration expression $r_1$ can be restored to the original image data $I_1$ by being decoded by an image decoder 205 (see FIG. 5) to be described later. The image encoder 102 outputs the restoration expression $r_1$ to the restoration expression storage unit 106.

The difference encoder 107 extracts an extended difference expression D from the two pieces of image data I captured before and after the operation of the robot RM. The extended difference expression D includes, for example, feature information about a difference between the two pieces of image data I caused by the motion of the robot RM and feature information about a difference between the two pieces of image data I not caused by the motion of the robot RM (caused by a change in the illumination environment or the like). For example, the difference encoder 107 extracts an extended difference expression $D_k$ at a time $t_k$ from image data $I_k$ at the time $t_k$ and a restoration expression $r_{k-1}$ of image data $I_{k-1}$ at a time $t_{k-1}$ immediately before the time $t_k$. The extended difference expression $D_k$ indicates feature information about a difference between the image data $I_k$ and the image data $I_{k-1}$. The extended difference expression $D_k$ is a tensor having the same number of dimensions as the restoration expression $r_1$. The difference encoder 107 outputs the extended difference expression D at a plurality of times to the restoration expression generation unit 104 in chronological order.

The restoration expression generation unit 104 adds the restoration expression $r_{k-1}$ of the image data $I_{k-1}$ at the time $t_{k-1}$ and noise $N_k$ to the extended difference expression $D_k$ at the time $t_k$ to generate a restoration expression $r_k$ of the image data $I_k$ at the time $t_k$. The restoration expression $r_k$ can be restored to the original image data $I_k$ by being decoded by the image decoder 205. The restoration expression generation unit 104 outputs the restoration expressions r of the image data I at the plurality of times to the restoration expression storage unit 106 in chronological order.

The restoration expression storage unit 106 stores the restoration expression $r_1$ of the image data $I_1$ at the time $t_1$ output from the image encoder 102 or the restoration expression $r_k$ of the image data $I_k$ at the time $t_k$ output from the restoration expression generation unit 104. The restoration expression storage unit 106 stores the restoration expression $r_{k-1}$ of the image data $I_{k-1}$ at the previous time $t_{k-1}$ until the restoration expression $r_k$ of the image data $I_k$ at the next time $t_k$ is input. For example, when the restoration expression $r_k$ of the image data $I_k$ at the next time $t_k$ is input, the restoration expression storage unit 106 rewrites the restoration expression $r_{k-1}$ of the image data $I_{k-1}$ at the previous time $t_{k-1}$ with the restoration expression $r_k$ of the image data $I_k$ at the next time $t_k$.

The difference expression extraction unit 108 extracts a difference expression d representing feature information about a difference between the two pieces of image data I based on the two pieces of image data I captured before and after the operation of the robot RM. For example, the difference expression extraction unit 108 extracts a difference expression $d_k$ at the time $t_k$ indicating the feature information caused by the motion of the object OB (robot RM) from the extended difference expression $D_k$ at the time $t_k$. The extended difference expression D includes, for example, feature information about a difference caused by a change in color of the object OB due to the illumination environment or the like and feature information about a difference caused by the motion of the object OB. The difference expression extraction unit 108 selectively extracts, from the extended difference expression D, only the difference expression d representing the feature information about the difference between the two pieces of image data I caused by the motion of the object OB. The difference expression d is a tensor having the same number of dimensions as the extended difference expression D. The difference expression d is represented by components of a portion of the tensor representing the extended difference expression D. Which component of the tensor representing the extended difference expression D is to be extracted as the difference expression d is learned by machine learning to be described later. The difference expression extraction unit 108 outputs the difference expressions d at a plurality of times to the correlation region extraction unit 110 in chronological order.

The drive amount data acquisition unit 109 is an operation amount data acquisition unit that acquires operation amount data of the robot RM (object OB). The operation amount data is, for example, data of the drive amount (rotation change amount of the motor MT) of each motor MT supplied to the drive device 130. The drive amount data acquisition unit 109 acquires, for example, drive amount data R of the motor MT at a plurality of times from the time $t_1$ to the time $t_T$ in chronological order based on the drive signal of the drive device 130 input from the controller 115. The drive amount data acquisition unit 109 performs preprocessing such as noise removal on the drive signal input from the controller 115 as necessary. The drive amount data acquisition unit 109 outputs the drive amount data R at the plurality of times to the correlation region extraction unit 110 in chronological order.

The correlation region extraction unit 110 extracts a region where the difference expression $d_k$ at the time $t_k$ and drive amount data $R_k$ at the time $t_k$ are correlated with each other as a correlation region $C_k$ at the time $t_k$.

Figure 2:
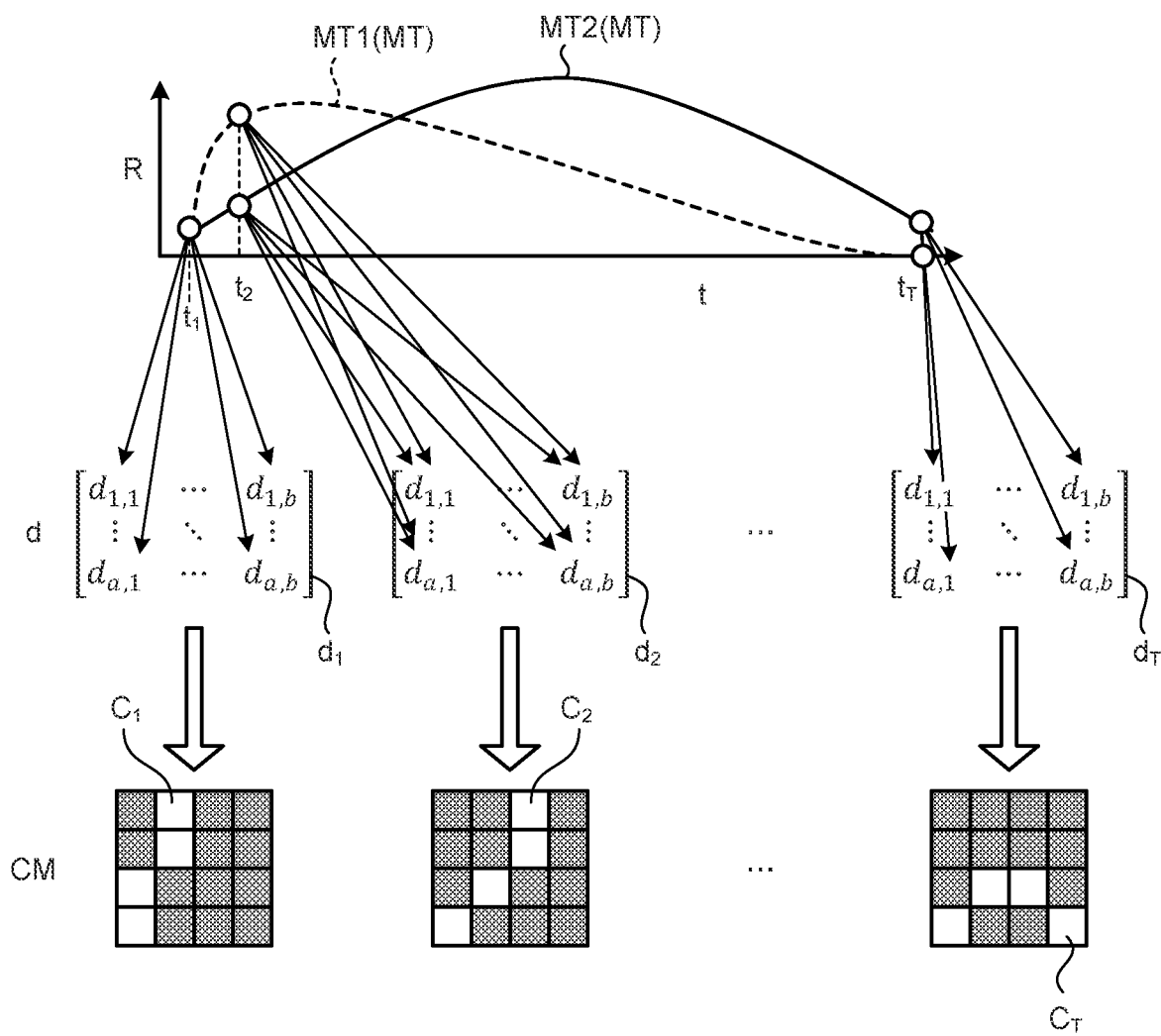
FIG. 2 is a diagram illustrating an example of a method of extracting a correlation region.

FIG. 2 is a diagram illustrating an example of a method of extracting the correlation region $C_k$. The upper part of FIG. 2 is a graph illustrating temporal changes in the drive amounts of the plurality of motors MT. The middle part of FIG. 2 illustrates the difference expression d $(d_1, d_2, \ldots, d_T)$ of each time. The lower part of FIG. 2 is a correlation map CM indicating the correlation between the drive amount data R and the difference expression d. In FIG. 2, the difference expression d is illustrated as a two-dimensional matrix. The correlation map CM is a heat map in which values of individual components of a two-dimensional matrix are expressed as colors or shades. In the example of FIG. 2, the number of motors MT is two (a motor MT1 and a motor MT2).

The drive amount of each motor MT is a one-dimensional numerical value. The difference expression d is a tensor having two dimensions or more. The correlation region extraction unit 110 calculates the correlation between the difference expression d and the drive amount data R by calculating the product of the sum of the data of the drive amounts of all the motors MT and each component of the tensor representing the difference expression d. For example, the correlation region extraction unit 110 binarizes each component of the tensor indicating the correlation between the difference expression $d_k$ at the time $t_k$ and the drive amount data $R_k$ at the time $t_k$ based on a predetermined threshold value. The correlation region extraction unit 110 extracts one or more components converted into the value of 1 by the binarization processing as the correlation region $C_k$ at the time $t_k$. In the correlation map CM, a region including one or more components indicated by white is a correlation region C $(C_1, C_2, \ldots, C_T)$. The correlation region extraction unit 110 outputs correlation regions C at a plurality of times to the mirror surface region identification unit 111 in chronological order. The mirror surface region identification unit 111 identifies a mirror surface region MA based on the correlation between the difference expressions d at the plurality of times and the drive amount data R at the plurality of times.

Figure 3:
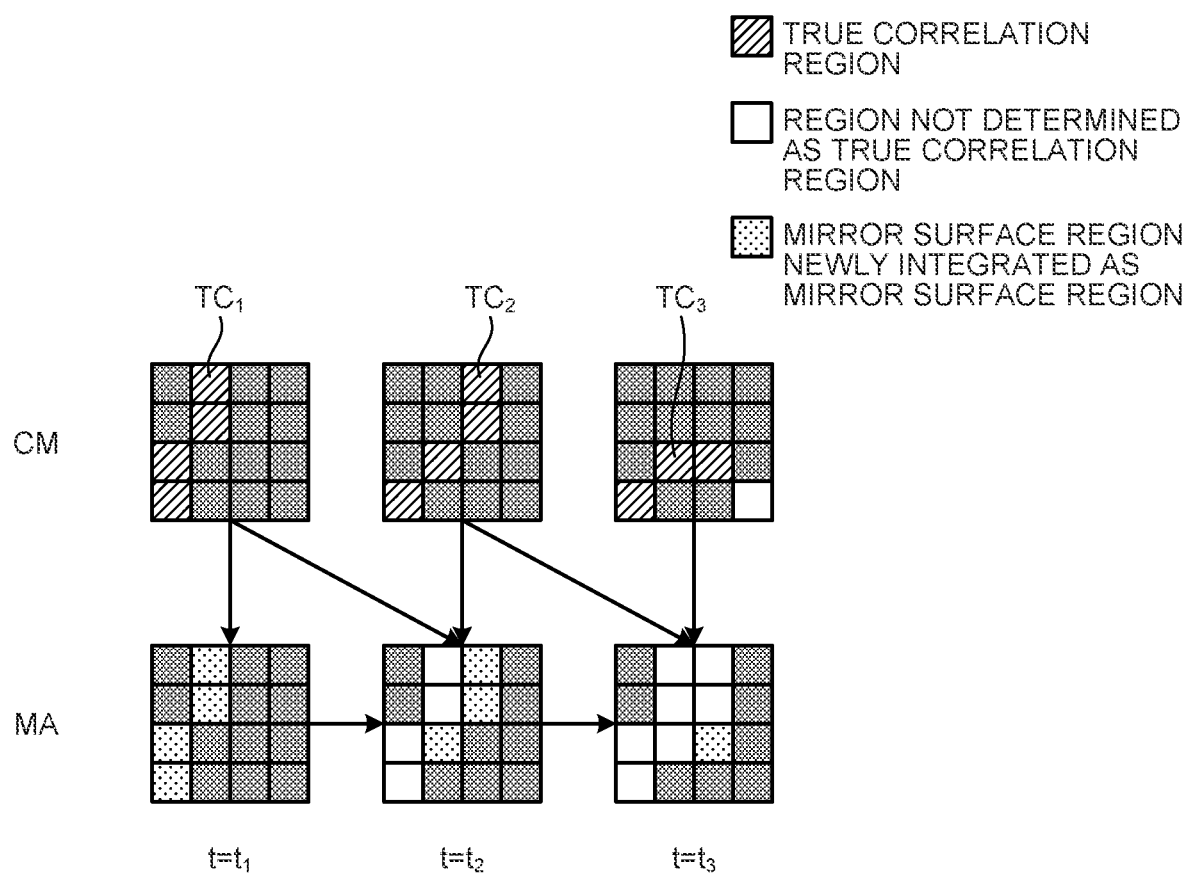
FIG. 3 is a view illustrating an example of a method of identifying a mirror surface region.

FIG. 3 is a diagram illustrating an example of a method of identifying the mirror surface region MA.

For example, the mirror surface region identification unit 111 identifies the mirror surface region MA based on the correlation regions C at the plurality of times. The correlation between the motion of the motor MT and the change in the image is considered to have spatial continuity in chronological order. Therefore, for example, the mirror surface region identification unit 111 extracts, as a true correlation region $TC_k$ at the time $t_k$, one or more components at a position superimposed on or adjacent to a correlation region $C_{k-1}$ at the time $t_{k-1}$ immediately before the time $t_k$ from among the one or more components extracted as the correlation region $C_k$ at the time $t_k$. The mirror surface region identification unit 111 integrates true correlation regions TC at a plurality of times to identify the mirror surface region MA.

For example, the mirror surface region identification unit 111 determines all the correlation regions $C_1$ extracted at the initial time $t_1$ as true correlation regions $TC_1$. The mirror surface region identification unit 111 does not integrate a region that is not extracted as the true correlation region $TC_k$ in the correlation region $C_k$ into the mirror surface region MA. In the example of FIG. 3, the rightmost component among the four components of the tensor extracted as a correlation region $C_3$ is neither superimposed on nor adjacent to any of the four components of the tensor extracted as a correlation region $C_2$. Therefore, the rightmost component of the correlation region $C_3$ is not integrated into the mirror surface region MA.

Returning to FIG. 1, the route search unit 112 searches for a movement route of the robot RM. The route search unit 112 searches for, for example, a route such that the robot does not move in the direction in which the mirror surface region MA exists.

For example, the self-recognition unit 113 recognizes the object OB existing in the mirror surface region MA as its own object. For example, the self-recognition unit 113 distinguishes its own object from another object by attaching different labels to its own object (object OB) and another object other than its own object among the plurality of objects included in the image data I.

For example, the appearance determination unit 114 determines the current appearance of its own object based on a difference between the appearance of its own object (object OB) extracted from the image data I at the current time acquired by the image data acquisition unit 101 and a predefined self-appearance model 172. Examples of the appearance of its own object include the presence or absence of a covering material covering the sensor, dirt, damage, and a decorative state. The appearance determination unit 114 outputs information about the appearance of its own object to the storage device 170.

The controller 115 integrally controls each unit of the robot RM. Various types of information detected by the robot RM are input to the controller 115. For example, the information detected by the sensor device 150, the information about the mirror surface region MA identified by the mirror surface region identification unit 111, the information about its own object detected by the self-recognition unit 113 and the appearance determination unit 114, the image data I captured by the imaging device 140, the restoration expression r of the image data I generated by the image encoder 102 and the restoration expression generation unit 104, and the like are input to the controller 115.

For example, the controller 115 controls the rotation of one or more motors MT via the drive device 130 such that the robot RM moves on the route searched out by the route search unit 112. The controller 115 performs, for example, correction of sensor parameters, notification to a user via the output device 160, and the like based on the appearance determined by the appearance determination unit 114.

The storage device 170 stores, for example, an information processing program 171 executed by the processing device 100, the self-appearance model 172, and appearance information 173. The information processing program 171 is a program that causes a computer to execute information processing of the information processing system 1. The processing device 100 performs various types of processing in accordance with the information processing program 171 stored in the storage device 170. The storage device 170 may be used as a work area for temporarily storing a processing result of the processing device 100. For example, the storage device 170 stores, as the appearance information 173, the information about the appearance of its own object determined by the appearance determination unit 114.

The storage device 170 includes any non-transitory storage medium, such as, for example, a semiconductor storage medium and a magnetic storage medium. The storage device 170 includes, for example, an optical disk, a magneto-optical disk, or a flash memory. The information processing program 171 is stored in, for example, a non-transitory computer-readable storage medium.

The processing device 100 is, for example, a computer including a processor and a memory. The memory of the processing device 100 includes a random access memory (RAM) and a read only memory (ROM). By executing the information processing program 171, the processing device 100 functions as the image data acquisition unit 101, the image encoder 102, the noise generation unit 103, the restoration expression generation unit 104, the restoration expression storage unit 106, the difference encoder 107, the difference expression extraction unit 108, the drive amount data acquisition unit 109, the correlation region extraction unit 110, the mirror surface region identification unit 111, the route search unit 112, the self-recognition unit 113, the appearance determination unit 114, and the controller 115.

2. Description of Method of Extracting Mirror Surface Region

Figure 4:
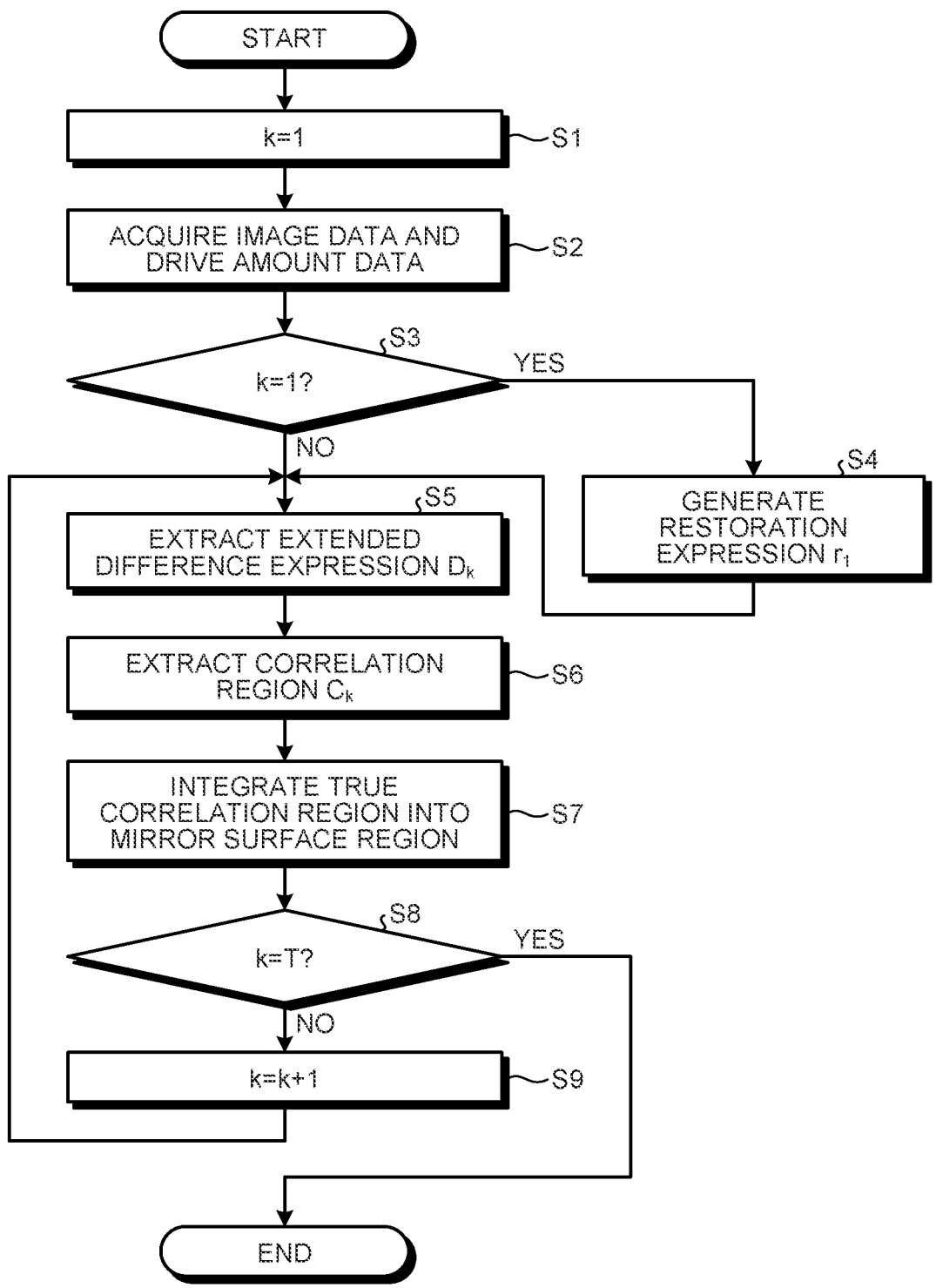
FIG. 4 is a flowchart illustrating an example of an information processing method for identifying a mirror surface region.

FIG. 4 is a flowchart illustrating an example of an information processing method for identifying the mirror surface region MA.

In step S1, the controller 115 sets a time parameter k to one.

In step S2, the image data acquisition unit 101 acquires the image data I of the object OB at a plurality of times from the time $t_1$ to the time $t_T$. The drive amount data acquisition unit 109 acquires the drive amount data R of the motor MT at a plurality of times from the time $t_1$ to the time $t_T$.

In step S3, the controller 115 determines whether the time parameter k is one. When it is determined that the time parameter k is one (step S3: Yes), the process proceeds to step S4. In step S4, the image encoder 102 generates the restoration expression $r_1$ of the image data $I_1$ at the time $t_1$. Then, the process proceeds to step S5.

In step S3, when it is determined that the time parameter k is not one (step S3: No), the process proceeds to step S5. In step S5, the difference encoder 107 extracts the extended difference expression $D_k$ at the time $t_k$ from the image data $I_k$ at the time $t_k$ and the restoration expression $r_{k-1}$ of the image data $I_{k-1}$ at the time $t_{k-1}$ immediately before the time $t_k$. Then, the process proceeds to step S6.

In step S6, the correlation region extraction unit 110 extracts a region where the difference expression $d_k$ at the time $t_k$ and the drive amount data $R_k$ at the time $t_k$ are correlated with each other as the correlation region $C_k$ at the time $t_k$.

Next, in step S7, the mirror surface region identification unit 111 extracts, as the true correlation region $TC_k$ at the time $t_k$, one or more components at a position superimposed on or adjacent to the correlation region $C_{k-1}$ at the time $t_{k-1}$ immediately before the time $t_k$ among the one or more components extracted as the correlation region $C_k$ at the time $t_k$. The mirror surface region identification unit 111 integrates the true correlation region $TC_k$ at the time $t_k$ into one or more true correlation regions TC extracted up to the time $t_{k-1}$ to identify a mirror surface region $MA_k$ at the time $t_k$.

Next, in step S8, the controller 115 determines whether the time parameter k is T. When it is determined that the time parameter k is T (step S8: Yes), the process is ended.

In step S8, when it is determined that the time parameter k is not T (step S8: No), the process proceeds to step S9. In step S9, the controller 115 adds one to the time parameter k. Then, the process returns to step S5.

Through the above processing, the mirror surface region identification unit 111 integrates the true correlation regions TC at a plurality of times from the time $t_1$ to the time $t_T$ to identify the mirror surface region MA.

3. Configuration of Learning System

Figure 5:
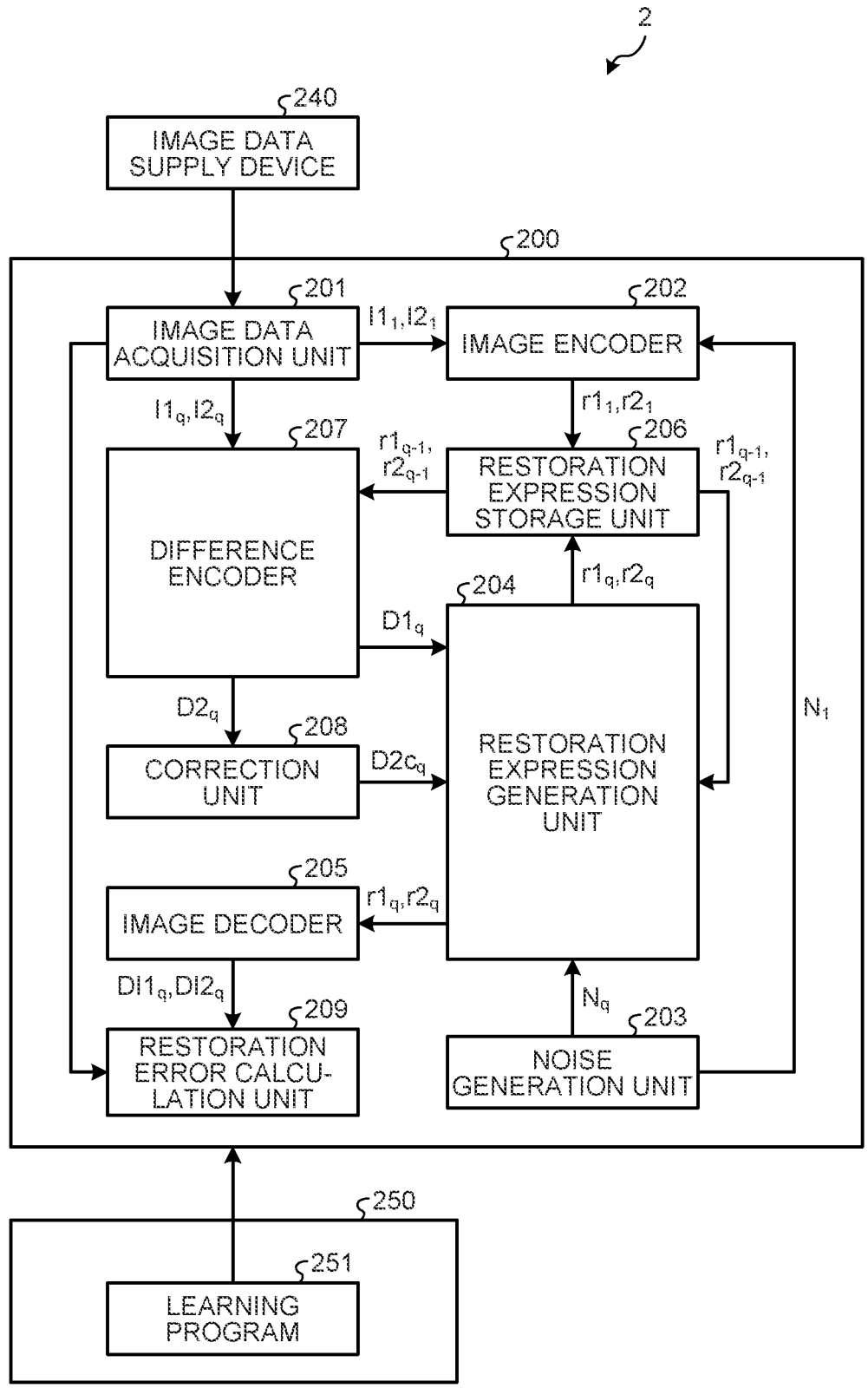
FIG. 5 is a schematic diagram illustrating an example of a learning system.

FIG. 5 is a schematic diagram illustrating an example of a learning system 2. The learning system 2 optimizes a weight of a neural network that encodes and decodes image data by machine learning. An image encoder 202 and a difference encoder 207 obtained by machine learning are used as the image encoder 102 and the difference encoder 107 of the information processing system 1.

The machine learning includes a first learning process and a second learning process. The first learning process is a learning process using learning image data (first learning image data I1) of a moving object OB at a plurality of times. The second learning process is a learning process using learning image data (second learning image data I2) of a stationary object OB at a plurality of times. The second learning image data I2 is pseudo moving image data in which only the color information about the object OB changes with time.

The learning system 2 includes, for example, a processing device 200, an image data supply device 240, and a storage device 250.

The image data supply device 240 supplies the first learning image data I1 and the second learning image data I2 to the processing device 200. For example, the image data supply device 240 outputs the video captured by the imaging device to the processing device 200 as the first learning image data I1. The imaging device includes, for example, an image sensor such as a CCD or a CMOS. The image data supply device 240 outputs, for example, the second learning image data I2 generated by the computer to the processing device 200.

The processing device 200 includes, for example, an image data acquisition unit 201, the image encoder 202, a noise generation unit 203, a restoration expression generation unit 204, the image decoder 205, a restoration expression storage unit 206, the difference encoder 207, a correction unit 208, and a restoration error calculation unit 209.

The image data acquisition unit 201, the image encoder 202, the noise generation unit 203, the restoration expression generation unit 204, the restoration expression storage unit 206, and the difference encoder 207 have functions similar to those of the image encoder 102, the noise generation unit 103, the restoration expression generation unit 104, the restoration expression storage unit 106, and the difference encoder 107 of the processing device 100. Therefore, the image decoder 205, the correction unit 208, and the restoration error calculation unit 209 will be mainly described below.

The correction unit 208 acquires extended difference expressions D2 at a plurality of times extracted using the second learning image data I2 from the difference encoder 207 in chronological order. The correction unit 208 performs correction to rewrite a portion of the tensor representing the extended difference expression D2 to zero. The correction unit 208 outputs the extended difference expression D2c after the correction to the restoration expression generation unit 204. Extended difference expressions D1 at a plurality of times extracted using the first learning image data I1 are directly output from the difference encoder 207 to the restoration expression generation unit 204 in chronological order without passing through the correction unit 208.

Therefore, the correction unit 208 does not perform the above-described correction process on the extended difference expressions D1.

The image decoder 205 decodes a restoration expression r1 of the learning image data I1 generated by the restoration expression generation unit 204 to generate restored image data DI1. The image decoder 205 decodes a restoration expression r2 of the learning image data I2 generated by the restoration expression generation unit 204 to generate restored image data DI2.

The restoration error calculation unit 209 calculates a restoration error between the restored image data DI1 and the original learning image data I1. The restoration error calculation unit 209 calculates a restoration error between the restored image data DI2 and the original learning image data I2. The processing device 200 repeats adjusting the weight of the neural network representing the image encoder 202, the difference encoder 207, the correction unit 208, and the image decoder 205 until the restoration error satisfies a predetermined criterion in each of the first learning process and the second learning process.

The storage device 250 stores, for example, a learning program 251 executed by the processing device 200. The learning program 251 is a program that causes a computer to execute a learning process of the learning system 2. The processing device 200 performs various types of processing in accordance with the learning program 251 stored in the storage device 250. The storage device 250 may be used as a work area for temporarily storing a processing result of the processing device 200.

The storage device 250 includes any non-transitory storage medium, such as, for example, a semiconductor storage medium and a magnetic storage medium. The storage device 250 includes, for example, an optical disk, a magneto-optical disk, or a flash memory. The learning program 251 is stored in, for example, a non-transitory computer-readable storage medium.

The processing device 200 is, for example, a computer including a processor and a memory. The memory of the processing device 200 includes a RAM and a ROM. By executing the learning program 251, the processing device 200 functions as the image data acquisition unit 201, the image encoder 202, the noise generation unit 203, the restoration expression generation unit 204, the image decoder 205, the restoration expression storage unit 206, the difference encoder 207, the correction unit 208, and the restoration error calculation unit 209.

4. Description of Learning Method

Figure 6:
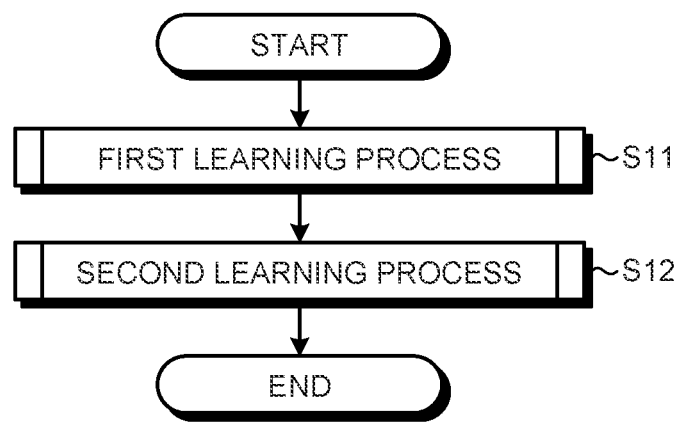
FIG. 6 is a flowchart illustrating an example of a learning method by the learning system.

FIG. 6 is a flowchart illustrating an example of a learning method by the learning system 2.

In step S11, the first learning process is executed. Then, in step S12, the second learning process is executed. Either the first learning process or the second learning process may be executed first, or the first learning process and the second learning process may be executed simultaneously.

Figure 7:
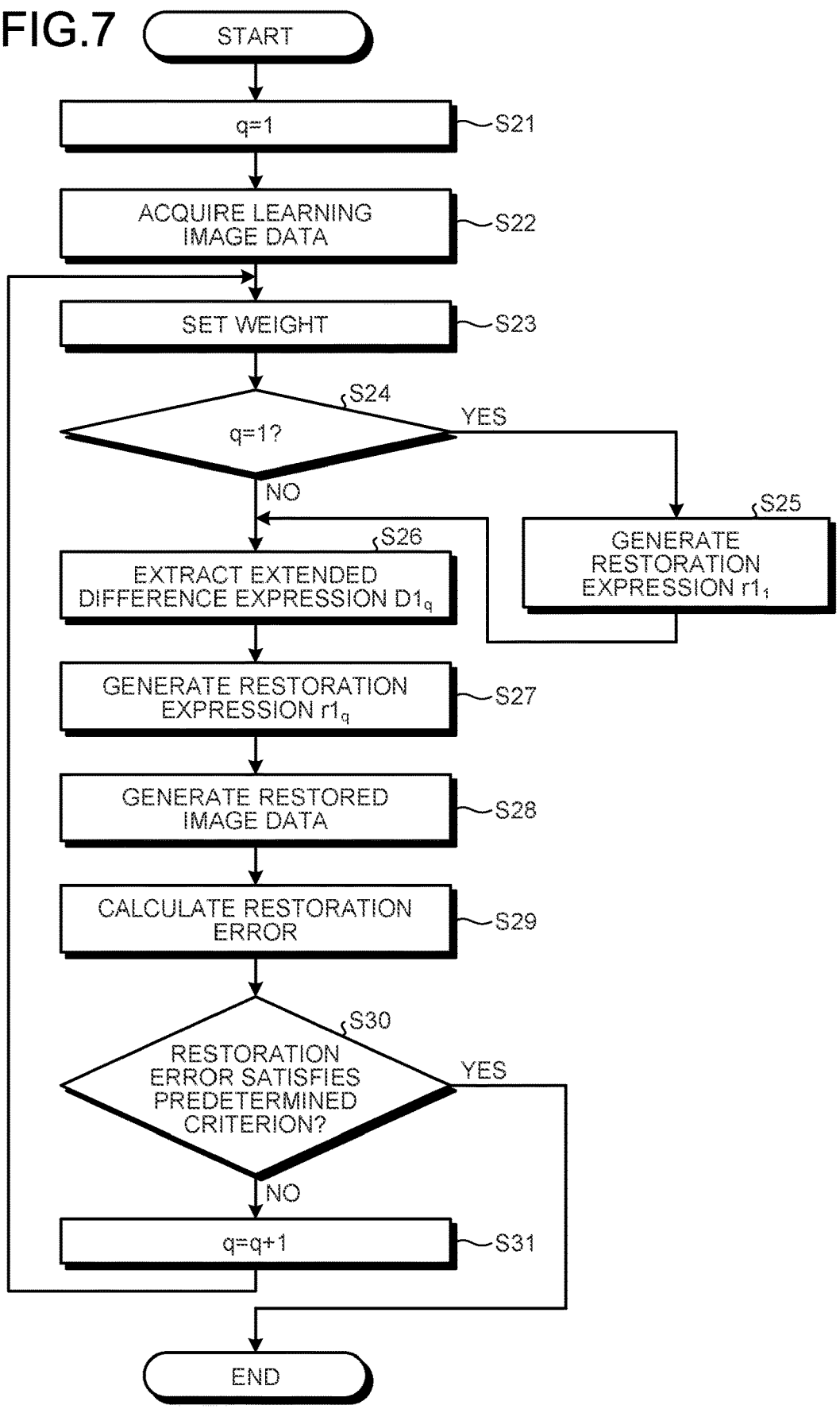
FIG. 7 is a flowchart illustrating an example of a first learning process.

FIG. 7 is a flowchart illustrating an example of the first learning process.

In step S21, the processing device 200 sets a time parameter q to one.

In step S22, the image data acquisition unit 201 acquires learning image data (first learning image data I1) of a moving object OB at a plurality of times.

In step S23, the processing device 200 sets the weight of the neural network.

In step S24, the processing device 200 determines whether the time parameter q is one. When it is determined that the time parameter q is one (step S24: Yes), the process proceeds to step S25. In step S25, the image encoder 202 generates a restoration expression $r1_1$ of learning image data $I1_1$ at the time $t_1$. Then, the process proceeds to step S26.

In step S24, when it is determined that the time parameter q is not one (step S24: No), the process proceeds to step S26. In step S26, the difference encoder 207 extracts an extended difference expression $D1_q$ at a time $t_q$ from learning image data $I1_q$ at the time $t_q$ and a restoration expression $r1_{q-1}$ of learning image data $I1_{q-1}$ at a time $t_{q-1}$ immediately before the time $t_q$.

In step S27, the restoration expression generation unit 204 adds the restoration expression $r1_{q-1}$ of the learning image data $I1_{q-1}$ at the time $t_{q-1}$ and noise $N_q$ to the extended difference expression $D1_q$ at the time $t_q$ to generate the restoration expression $r1_q$ of the learning image data $I1_q$ at the time $t_q$.

In step S28, the image decoder 205 decodes the restoration expression $r1_q$ of the learning image data $I1_q$ at the time $t_q$ to generate the restored image data $DI1_q$ at the time $t_q$.

In step S29, the restoration error calculation unit 209 calculates a restoration error between the restored image data $DI1_q$ at the time $t_q$ and the learning image data $I1_q$ at the time $t_q$.

In step S30, the processing device 200 determines whether the restoration error satisfies a predetermined criterion. When it is determined that the restoration error satisfies the predetermined criterion (step S30: Yes), the first learning process is ended.

In step S30, when it is determined that the restoration error does not satisfy the predetermined criterion (step S30: No), the process proceeds to step S31. In step S31, the processing device 200 adds one to the time parameter q. Then, the process proceeds to step S23.

Through the above processing, the processing device 200 repeats adjusting the weight of the neural networks representing the image encoder 202, the difference encoder 20, and the image decoder 205 until the restoration error satisfies the predetermined criterion.

Figure 8:
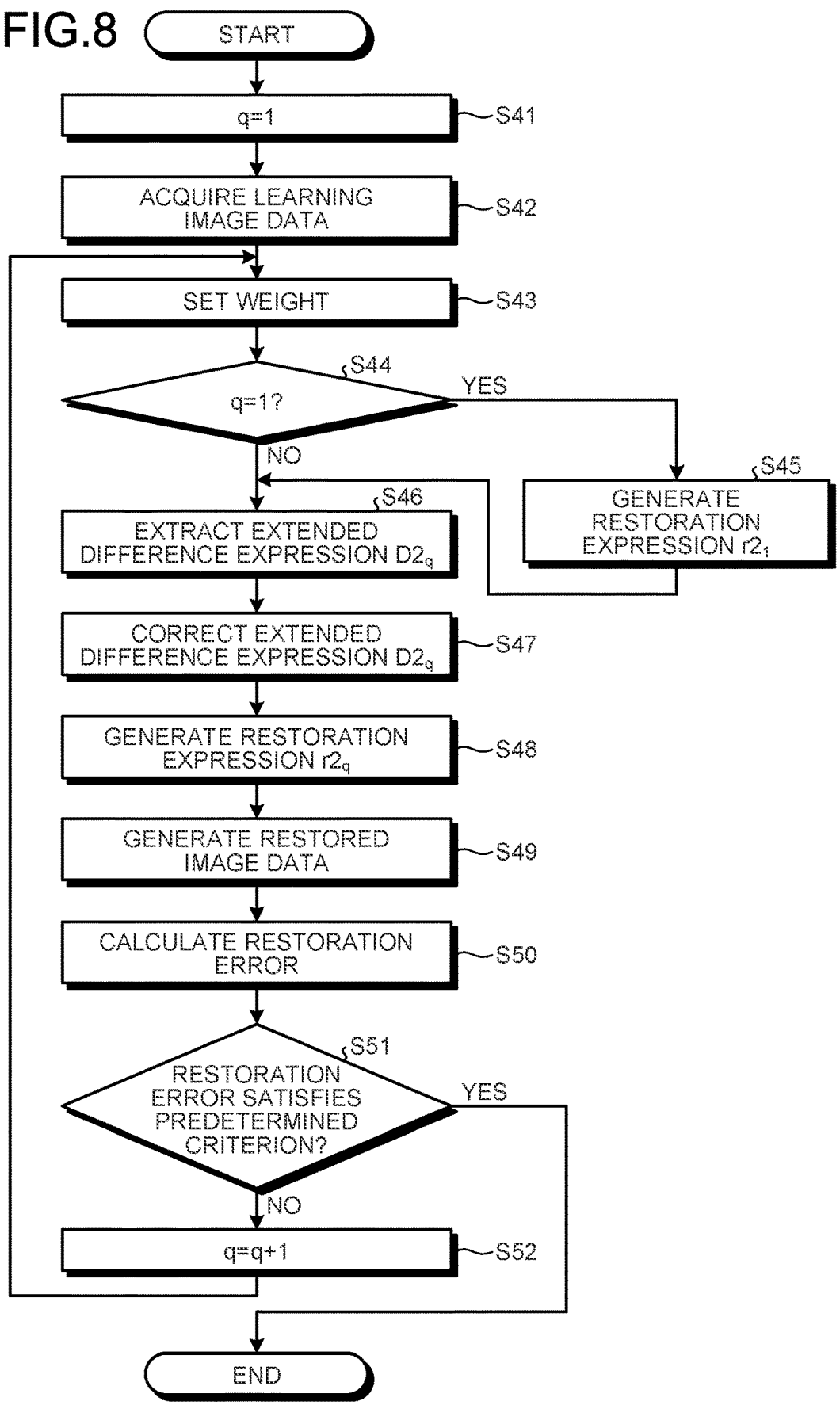
FIG. 8 is a flowchart illustrating an example of a second learning process.

FIG. 8 is a flowchart illustrating an example of the second learning process.

In step S41, the processing device 200 sets the time parameter q to one.

In step S42, the image data acquisition unit 201 acquires learning image data (second learning image data I2) of a stationary object OB at a plurality of times.

In step S43, the processing device 200 sets the weight of the neural network.

In step S44, the processing device 200 determines whether the time parameter q is one. When it is determined that the time parameter q is one (step S44: Yes), the process proceeds to step S45. In step S45, the image encoder 202 generates a restoration expression $r2_1$ of learning image data $I2_1$ at the time $t_1$. Then, the process proceeds to step S46.

In step S44, when it is determined that the time parameter q is not one (step S44: No), the process proceeds to step S46. In step S46, the difference encoder 207 extracts an extended difference expression $D2_q$ at the time $t_q$ from learning image data $I2_q$ at a time $t_q$ and a restoration expression $r2_{q-1}$ of learning image data $I2_{q-1}$ at the time $t_{q-1}$ immediately before the time $t_q$.

In step S47, the correction unit 208 performs correction to rewrite a portion of the tensor representing the extended difference expression $D2_q$ at the time $t_q$ to zero.

In step S48, the restoration expression generation unit 204 adds the restoration expression $r2_{q-1}$ of the learning image data $I2_{q-1}$ at a time $t_{q-1}$ and the noise $N_q$ to an extended difference expression $D2c_q$ of the time $t_q$ after the correction to generate a restoration expression $r2_q$ of the learning image data $I2_q$ at the time $t_q$.

In step S49, the image decoder 205 decodes the restoration expression $r2_q$ of the learning image data $I2_q$ at the time $t_q$ to generate restored image data $DI2_q$ at the time $t_q$.

In step S50, the restoration error calculation unit 209 calculates a restoration error between the restored image data $DI2_q$ at the time $t_q$ and the learning image data $I2_q$ at the time $t_q$.

In step S51, the processing device 200 determines whether the restoration error satisfies a predetermined criterion. When it is determined that the restoration error satisfies the predetermined criterion (step S51: Yes), the second learning process is ended.

In step S51, when it is determined that the restoration error does not satisfy the predetermined criterion (step S51: No), the process proceeds to step S52. In step S52, the processing device 200 adds one to the time parameter q. Then, the process proceeds to step S43.

Through the above processing, the processing device 200 repeats adjusting the weight of the neural network representing the image encoder 202, the difference encoder 207, the correction unit 208, and the image decoder 205 until the restoration error satisfies the predetermined criterion.

In the second learning process, pseudo moving image data (second learning image data I2) in which the object OB does not move is used as the learning image data. In the second learning process, the weight of the neural network is optimized such that the original image data I2 is restored even when a portion of the tensor representing the extended difference expression D2 is rewritten to zero.

The range of the tensor to be rewritten to zero is arbitrarily set, for example, at the start of the learning process. The range of the tensor to be rewritten to zero is gradually increased as the learning process progresses. In a case where the restoration error increases with an increase in the range of the tensor to be rewritten to zero, the range of the tensors to be rewritten to zero is decreased. Then, the range of the tensor to be rewritten to zero is repeatedly increased and decreased until the restoration error satisfies a predetermined criterion.

Figure 9:
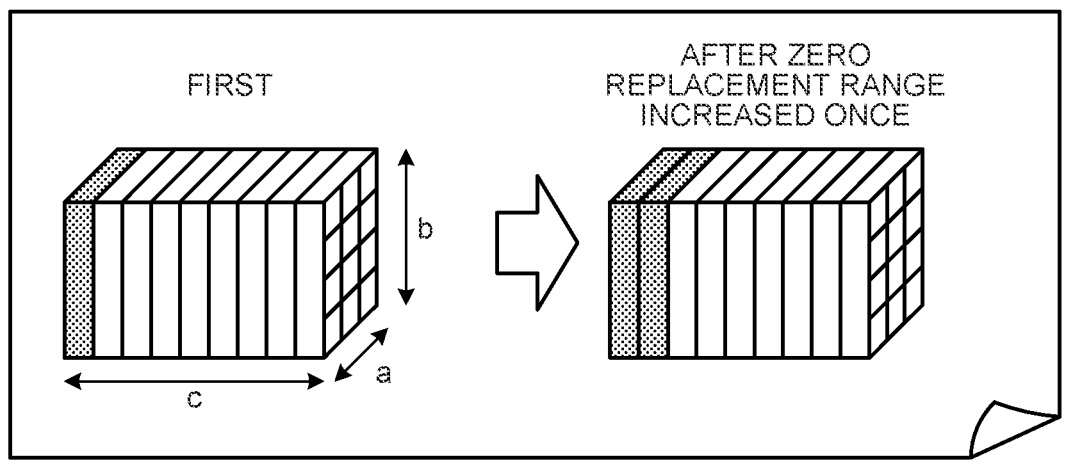
FIG. 9 is a diagram illustrating an example of a correction step.

FIG. 9 is a diagram illustrating an example of a correction step. In the example of FIG. 9, the extended difference expression D2 is illustrated as a three-dimensional tensor having $a \times b \times c$ (a, b, and c are integers of two or more) components.

The plurality of components constituting the tensor is divided into c blocks disposed in one dimension direction. Each block includes $a \times b$ components. At the start of the learning process, the correction unit 208 selects one block from the plurality of blocks and rewrites all the plurality of components included in the selected block to zero. For example, whether the restoration error satisfies a predetermined criterion is determined by the initial Q (Q is an integer of two or more) weight adjustment processes (q=1 to Q) in FIG. 8.

The number of repetitions Q of the weight adjustment process is arbitrarily set. For example, a fixed number of times or a number of times that calculation can be performed within a fixed time may be set as the number of repetitions Q.

Alternatively, the number of times until the change rate of the restoration error calculated in time series (the difference between the restoration error calculated at a certain time and the restoration error calculated at the time immediately before the certain time) is equal to or less than a threshold value may be set as the number of repetitions Q.

In a case where the restoration error does not satisfy the predetermined criterion by the initial Q weight adjustment processes, each component of the next second block is also rewritten to zero, and the next Q weight adjustment processes (q=Q+1 to 2Q) are performed. In a case where the restoration error does not satisfy the predetermined criterion even by this weight adjustment process, the correction unit 208 further rewrites each component of the adjacent block to zero. Hereinafter, the similar process is repeated. In a case where the restoration error satisfies the predetermined criterion, it is determined that the range of the tensor rewritten to zero at that time is the range to be extracted as the difference expression d.

In a case where the restoration error turns from a decrease to an increase while the restoration error does not satisfy the predetermined criterion, the range of the tensor to be rewritten to zero is gradually decreased. For example, in a case where the number of blocks rewritten to zero is p (p is an integer of one or more) when the restoration error is minimized, rewriting to zero is stopped for some of the plurality of components included in the p-th block. Then, it is determined whether the restoration error satisfies a predetermined criterion by the next Q weight adjustment processes. In a case where the restoration error does not satisfy the predetermined criterion, the range in which the rewriting to zero is stopped is further increased. By repeating such processing, the restoration error gradually decreases. In a case where the restoration error satisfies the predetermined criterion, it is determined that the range of the tensor rewritten to zero at that time is the range to be extracted as the difference expression d.

The pseudo moving image data does not include the motion of the object OB. Therefore, among the components of the tensor representing the extended difference expression D2, the value of the component indicating the feature information about the motion of the object OB is zero. In a case where the original learning image data I2 is restored even when a portion of the tensor representing the extended difference expression D2 is rewritten to zero, the portion that is to be rewritten to zero by the correction unit 208 is estimated to be a portion indicating the feature information caused by the motion of the object OB. Therefore, the difference expression extraction unit 108 of the information processing system 1 extracts, for example, a portion, that is to be rewritten to zero by the correction unit 208, of the tensor representing the extended difference expression D as the difference expression d. As a result, it is easy to identify the image region in conjunction with the motion of the subject (object OB). Therefore, the detection accuracy of the mirror surface region MA is enhanced.

5. Application Example 1 of Information Processing System

Figure 10:
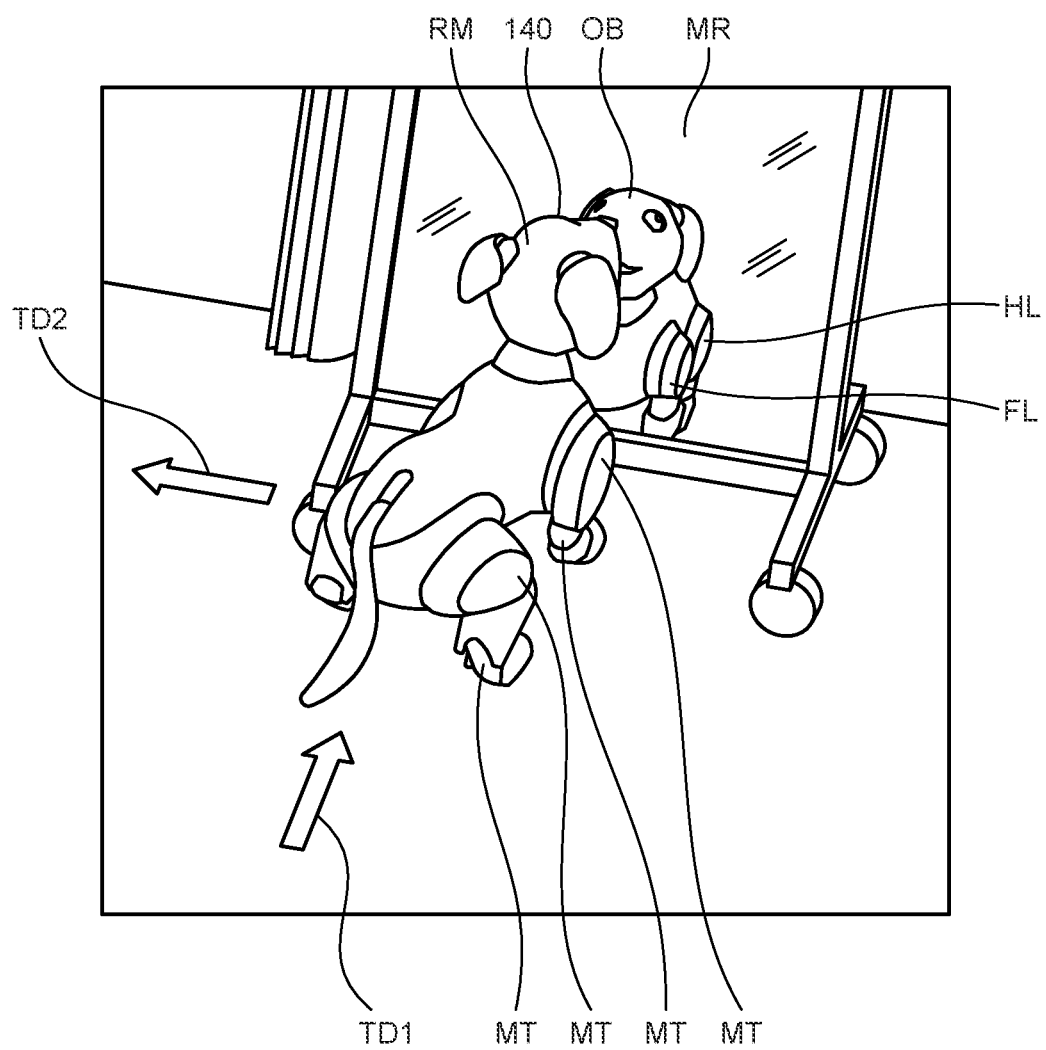
FIG. 10 is a diagram illustrating an example of control of a robot by the information processing system.

FIG. 10 is a diagram illustrating an example of control of the robot RM by the information processing system 1.

The robot RM incorporates a plurality of motors MT. The controller 115 can move the robot RM in any direction by controlling the rotation of the plurality of motors MT via the drive device 130.

In FIG. 10, a mirror MR exists in front of the robot RM in a moving direction TD1. The robot RM captures an image of the object OB reflected in the mirror MR at regular time intervals while moving toward the mirror MR. The robot RM identifies the mirror surface region MA based on the time-series drive amount data R of the plurality of motors MT during the movement and the time-series image data I captured by the imaging device 140. For example, in the example of FIG. 10, a foreleg image FL and a hind leg image HL of the robot RM change in conjunction with the drive of the motor MT. Therefore, in the restoration expression r of the image data I, a region in the feature space in which the feature information about the foreleg image FL is indicated is identified as the mirror surface region MA.

The controller 115 determines whether a mirror surface region MA having a size exceeding the threshold value exists ahead in a traveling direction TD1. When it is determined that the mirror surface region MA having a size exceeding the threshold value exists ahead in the traveling direction TD1, the controller 115 causes the route search unit 112 to search for a route again. For example, the route search unit 112 searches for a route in a detour direction TD2 such that the robot does not move in the direction in which the mirror surface region MA exists. As a result, collision with the mirror MR is avoided.

6. Application Example 2 of Information Processing System

Figure 11:
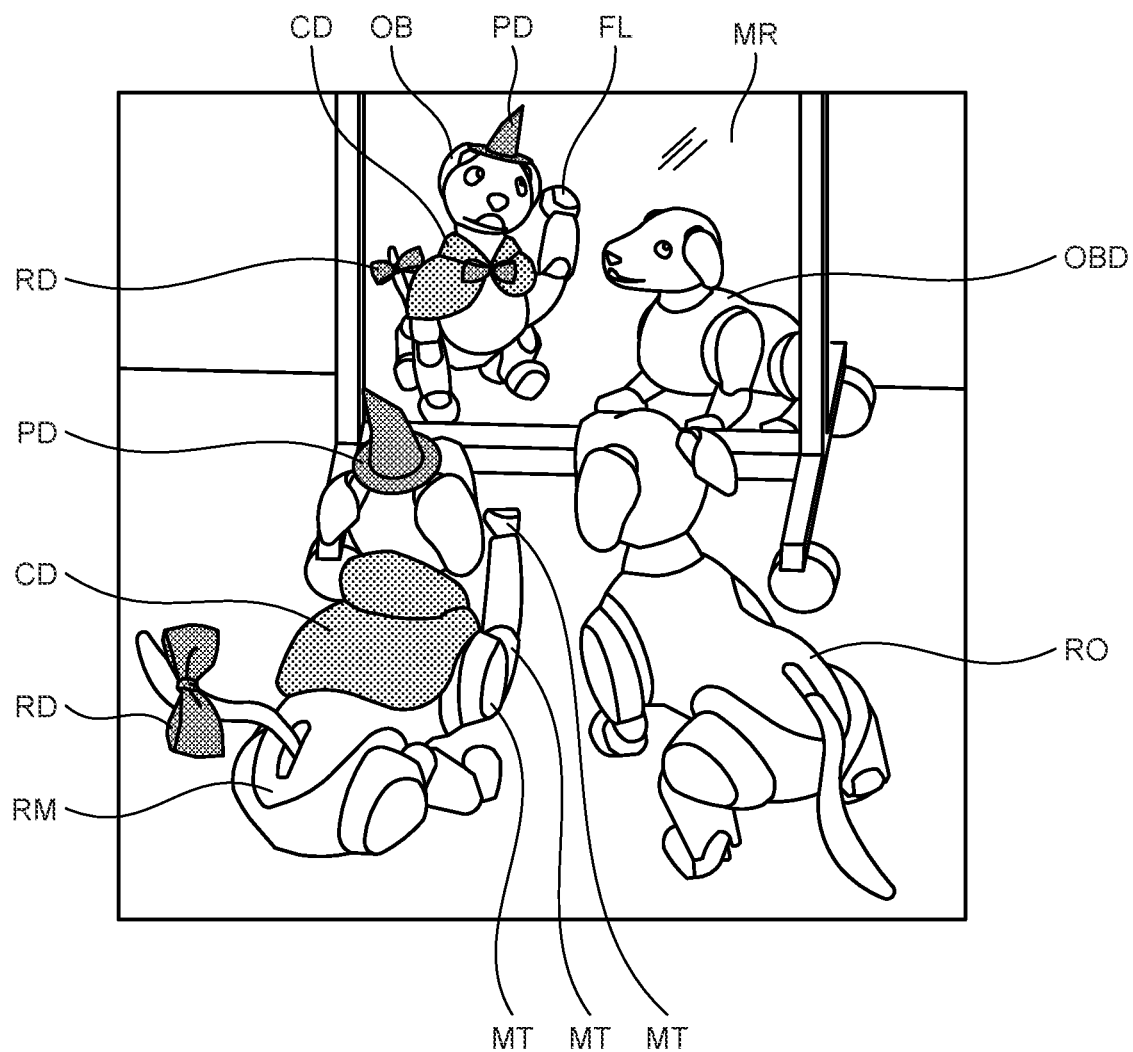
FIG. 11 is a diagram illustrating an example of control of a robot by the information processing system.
Figure 12:
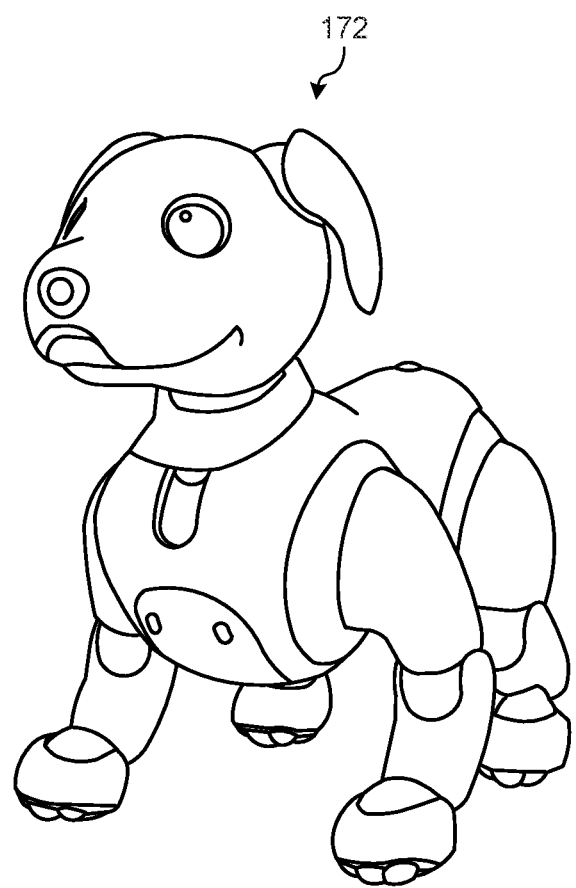
FIG. 12 is a view illustrating an example of a self-appearance model.

FIG. 11 is a diagram illustrating an example of control of the robot RM by the information processing system 1. FIG. 12 is a view illustrating an example of the self-appearance model 172.

In FIG. 11, a robot RO similar to the robot RM in shape exists near the robot RM. A plurality of objects (object OB, object OBD) having similar shapes is reflected in the mirror MR. The controller 115 moves the robot RM via the drive device 130. The imaging device 140 captures an image in front of the robot RM in accordance with the timing at which the drive device 130 drives the motor MT. The robot RM identifies the mirror surface region MA based on the time-series drive amount data R of each motor MT in operation and the time-series image data I captured by the imaging device 140. For example, in the example of FIG. 11, the foreleg image FL of the robot RM changes in conjunction with the drive of the motor MT. Therefore, a region in the feature space of the foreleg image FL is identified as the mirror surface region MA.

The self-recognition unit 113 recognizes the object OB existing in the mirror surface region MA as its own object among the plurality of objects included in the image data. For example, the self-recognition unit 113 identifies a region in the feature space in which the feature information about the images of the plurality of objects is indicated in the restoration expression r of the image data I. The self-recognition unit 113 recognizes the object OB whose feature information is indicated in the region superimposed on the mirror surface region MA as its own object.

The appearance determination unit 114 determines the current appearance of its own object based on, for example, a difference between the appearance of its own object extracted from the image data and the predefined self-appearance model 172. For example, FIG. 12 illustrates an appearance at the time of factory shipment as an example of the self-appearance model 172. In the example of FIG. 11, the object OB has an appearance in which a hat PD, clothes CD, and a ribbon RD are added to the self-appearance model 172. The appearance determination unit 114 extracts features (shape, color, position, etc.) of the hat PD, the clothes CD, and a ribbon RD from the restoration expression r of the image data I. The appearance determination unit 114 recognizes the current state of its own object such as the presence or absence of a covering material covering the sensor, dirt, damage, and a decorative state based on the extraction result. Information about the appearance of its own object determined by the appearance determination unit 114 is stored in the storage device 170 as appearance information 173. The self-recognition unit 113 can distinguish its own object from another object based on the information about the appearance of its own object stored in the storage device 170.

For example, when it is determined that there is a covering material covering a sound sensor, the controller 115 can correct the sensor parameter to increase the sensitivity of the sound sensor. The controller 115 can also control the drive device 130 to move the body of the robot RM and remove the covering material. When the robot RM cannot remove the covering material by itself, the controller 115 can make a notification to the user by controlling the output device 160 such as a speaker. Also when it is determined that there is dirt or damage, the controller 115 can notify the user of it using the output device 160.

The controller 115 can control the behavior of the robot RM based on the appearance information 173 detected by the appearance determination unit 114. For example, in a case where the controller 115 determines that the robot RM is dressed like a hina doll (hina ningyo), the controller 115 can control the drive device 130 to move the robot RM toward a nearby platform (hina dan). In a case where the controller 115 determines that the robot RM wears the Santa Claus costume, the controller 115 can control the speaker to play the Christmas music. In a case where the controller 115 determines that an accessory added to the robot RM is detached, the controller 115 can also control the drive device 130 to pick up the accessory.

7. Effects

The information processing system 1 includes the drive amount data acquisition unit 109, the image data acquisition unit 101, the difference expression extraction unit 108, and the mirror surface region identification unit 111. The drive amount data acquisition unit 109 acquires the drive amount data R of the motor MT (the operation amount of the robot RM). The image data acquisition unit 101 acquires image data I captured by the imaging device 140 mounted on the robot RM. The difference expression extraction unit 108 extracts a difference expression d representing feature information about a difference between the two pieces of image data I based on the two pieces of image data I captured before and after the operation of the robot RM. The mirror surface region identification unit 111 identifies the mirror surface region MA based on the correlation between the difference expression d and the drive amount data R.

According to this configuration, the mirror surface region MA is identified from the image region that moves in conjunction with the motion of the robot RM. Therefore, even if an object exhibiting a similar motion is included in the image data I, there is a low possibility that the region where the object exists is erroneously recognized as the mirror surface region MA. Therefore, the mirror surface region MA is accurately detected.

For example, the information processing system 1 includes the difference encoder 107 that extracts, from the two pieces of image data I captured before and after the operation of the robot RM, the extended difference expression D including the feature information about the difference between the two pieces of image data I caused by the motion of the robot RM and the feature information about the difference between the two pieces of image data I not caused by the motion of the robot RM. For example, the difference expression extraction unit 108 selectively extracts, from the extended difference expression D, a difference expression d representing feature information about a difference between the two pieces of image data I caused by the motion of the robot RM.

According to this configuration, for example, it is possible to prevent an erroneous region from being identified as the mirror surface region MA based on the information about the difference of the image data I caused by a change in the illumination environment or the like, which is not linked with the motion of the robot RM.

The drive amount data acquisition unit 109 acquires, for example, the drive amount data R of the motor MT at a plurality of times from the time $t_1$ to the time $t_T$ where T is an integer of two or more. The image data acquisition unit 101 acquires, for example, image data I at a plurality of times. For example, the difference encoder 107 extracts the extended difference expression $D_k$ at the time $t_k$ from the image data $I_k$ at the time $t_k$ where k is an integer of 2 to T and the restoration expression $r_k$ of the image data $I_{k-1}$ at the time $t_{k-1}$ immediately before the time $t_k$. For example, the difference expression extraction unit 108 extracts the difference expression $d_k$ at the time $t_k$ indicating the feature information caused by the motion of the object OB from the extended difference expression $D_k$ at the time $t_k$. For example, the mirror surface region identification unit 111 identifies the mirror surface region MA based on the correlation between the difference expressions d at the plurality of times and the drive amount data R at the plurality of times.

According to this configuration, the range of the mirror surface region MA is sequentially identified based on the image data I and the drive amount data R at the plurality of times acquired in chronological order.

The difference encoder 107 is, for example, a neural network in which weights are optimized by machine learning. The machine learning includes, for example, a learning process using learning image data I2 of a stationary object OB at a plurality of times. A learning method including the learning process is executed by a computer.

The learning process includes, for example, a first restoration expression generation step, an extended difference expression extraction step, a correction step, a second restoration expression generation step, a restored image data generation step, a restoration error calculation step, and a weight adjustment step. The first restoration expression generation step includes generating, for example, the restoration expression $r2_1$ of the learning image data $I2_1$ at the time $t_1$. The extended difference expression extraction step includes, for example, inputting the learning image data $I2_q$ at the time $t_q$ where q is an integer of two or more and the restoration expression $r2_{q-1}$ of the learning image data $I2_{q-1}$ at the time $t_{q-1}$ immediately before the time $t_q$ to the difference encoder 207 to extract the extended difference expression $D2_q$ at the time $t_q$. The correction step includes, for example, inputting the extended difference expression $D2_q$ at the time $t_q$ to the correction unit 208, and performing correction to rewrite a portion of the tensor representing the extended difference expression $D2_q$ at the time $t_q$ to zero. The second restoration expression generation step includes, for example, adding the restoration expression $r2_{q-1}$ of the learning image data $I2_{q-1}$ at the time $t_{q-1}$ and the noise $N_q$ to the extended difference expression $D2c_q$ of the time $t_q$ after the correction to generate the restoration expression $r2_q$ of the learning image data $I2_q$ at the time $t_q$. The restored image data generation step includes, for example, decoding the restoration expression $r2_q$ of the learning image data $I2_q$ at the time $t_q$ by the image decoder 205 to generate the restored image data $DI2_q$ at the time $t_q$. The restoration error calculation step includes, for example, calculating a restoration error between the restored image data $DI2_q$ at the time $t_q$ and the learning image data $I2_q$ at the time $t_q$. The weight adjustment step includes, for example, repeating adjusting the weight of the neural network representing the image encoder 202, the difference encoder 207, the correction unit 208, and the image decoder 205 until the restoration error satisfies a predetermined criterion.

For example, the difference expression extraction unit 108 extracts a portion, that is to be rewritten to zero by the correction unit 208, of the tensor representing the extended difference expression D as the difference expression d.

According to this configuration, the pseudo moving image data (second learning image data I2) in which the object OB does not move is used as the learning image data. In the learning process using the pseudo moving image data, the weight of the neural network is optimized such that the original image data I2 is restored even when a portion of the tensor representing the extended difference expression D2 is rewritten to zero. The pseudo moving image data does not include the motion of the object OB. Therefore, among the components of the tensor representing the extended difference expression D2, the value of the component indicating the feature information about the motion of the object OB is zero. In a case where the original learning image data I2 is restored even when a portion of the tensor representing the extended difference expression D2 is rewritten to zero, the portion that is to be rewritten to zero by the correction unit 208 is estimated to be a portion indicating the feature information caused by the motion of the object OB. The difference expression extraction unit 108 extracts a portion, that is to be rewritten to zero by the correction unit 208, of the tensor representing the extended difference expression D as a difference expression d indicating feature information caused by the motion of the object OB. As a result, it is easy to identify the image region in conjunction with the motion of the object OB. Therefore, the detection accuracy of the mirror surface region MA is enhanced.

The information processing system includes, for example, the correlation region extraction unit 110. For example, the correlation region extraction unit 110 extracts a region where the difference expression $d_k$ at the time $t_k$ and the drive amount data $R_k$ at the time $t_k$ are correlated with each other as the correlation region $C_k$ at the time $t_k$. For example, the mirror surface region identification unit 111 identifies the mirror surface region MA based on the correlation regions C at the plurality of times.

According to this configuration, the mirror surface region MA is easily identified by integrating the correlation regions C at each time.

For example, the correlation region extraction unit 110 binarizes each component of the tensor indicating the correlation between the difference expression $d_k$ at the time $t_k$ and the drive amount data $R_k$ at the time $t_k$, and extracts one or more components converted into a value of one as the correlation region $C_k$ at the time $t_k$. For example, the mirror surface region identification unit 111 extracts, as the true correlation region $TC_k$ at the time $t_k$, one or more components at a position superimposed on or adjacent to the correlation region $C_{k-1}$ at the time $t_{k-1}$ immediately before the time $t_k$ from among the one or more components extracted as the correlation region $C_k$ at the time $t_k$, and integrates the true correlation regions TC at a plurality of times to identify the mirror surface region MA.

According to this configuration, only the correlation region C superimposed on or adjacent to the correlation region C at the previous time is extracted as the true correlation region TC. The correlation between the motion of the motor MT and the change in the image is considered to have spatial continuity in chronological order. Therefore, by extracting only the correlation region C continuous with the correlation region C at the previous time as the true correlation region TC, the detection accuracy of the mirror surface region MA is enhanced.

The information processing system 1 includes, for example, the route search unit 112. The route search unit 112 searches for, for example, a route such that the robot does not move in the direction in which the mirror surface region MA exists.

According to this configuration, collision with a member recognized as the mirror surface region MA is avoided.

The information processing system includes, for example, the self-recognition unit 113. For example, the self-recognition unit 113 recognizes the object OB existing in the mirror surface region MA as its own object.

The mirror surface region MA indicates an operation portion of the object OB linked with the motor MT. Therefore, the feature information about the image included in the mirror surface region MA is the feature information about the image of the object itself (its own object) on which the motor MT is mounted. Feature information about an image of an object other than its own object is not included in the mirror surface region MA. Therefore, the self-recognition unit 113 can reliably distinguish its own object from another object by recognizing the object OA existing in the mirror surface region MA as its own object.

The information processing system 1 includes, for example, the appearance determination unit 114. For example, the appearance determination unit 114 determines the current appearance of its own object based on a difference between the appearance of its own object extracted from the image data I at the current time acquired by the image data acquisition unit 101 and the predefined self-appearance model 172.

According to this configuration, the appearance determination unit 114 can recognize the current state of its own object such as the presence or absence of a covering material covering the sensor, dirt, damage, and a decorative state without using another dedicated sensor means.

The information processing system 1 includes, for example, the storage device 170. The storage device 170 stores, for example, information about the appearance of its own object determined by the appearance determination unit 114. The self-recognition unit 113 distinguishes its own object from another object based on, for example, the information about the appearance of its own object stored in the storage device 170.

According to this configuration, the self-recognition unit 113 can distinguish its own object from another object based on the appearance information stored in the storage device 170 without performing the arithmetic process of identifying the mirror surface region MA again.

Further, the effects described in the present specification are merely examples and are not limited, and other effects may be present.

The present technology may also be configured as below.

(1)

An information processing system comprising:
an operation amount data acquisition unit that acquires operation amount data of an object;
an image data acquisition unit that acquires image data captured by an imaging device mounted on the object;
a difference expression extraction unit that extracts, based on two pieces of image data captured before and after an operation of the object, a difference expression representing feature information about a difference between the two pieces of image data; and
a mirror surface region identification unit that identifies a mirror surface region based on a correlation between the difference expression and the operation amount data.

(2)

The information processing system according to (1), further comprising:
a difference encoder that extracts, from the two pieces of image data, an extended difference expression including feature information, of a difference between the two pieces of image data, caused by a motion of the object and feature information, of a difference between the two pieces of image data, not caused by a motion of the object, wherein
the difference expression extraction unit selectively extracts, from the extended difference expression, the difference expression representing the feature information, of the difference between the two pieces of image data, caused by a motion of the object.

(3)

The information processing system according to (2), wherein
the operation amount data acquisition unit acquires operation amount data at a plurality of times from a time $t_1$ to a time $t_T$ where T is an integer of two or more,
the image data acquisition unit acquires image data at the plurality of times,
the difference encoder extracts, from image data at a time $t_k$ where k is an integer of 2 to T and a restoration expression of image data at a time $t_{k-1}$ immediately before the time $t_k$, an extended difference expression at the time $t_k$,
the difference expression extraction unit extracts a difference expression at the time $t_k$ indicating feature information caused by a motion of the object from the extended difference expression at the time $t_k$, and
the mirror surface region identification unit identifies the mirror surface region based on a correlation between difference expressions at the plurality of times and operation amount data at the plurality of times.

(4)

The information processing system according to (3), wherein
the difference encoder is a neural network in which a weight is optimized by machine learning,
the machine learning includes a learning process using learning image data of the stationary object at a plurality of times,
the learning process includes
generating a restoration expression of learning image data at the time $t_1$,
inputting learning image data at a time $t_q$ where q is an integer of two or more and a restoration expression of learning image data at a time $t_{q-1}$ immediately before the time $t_q$ to the difference encoder to extract an extended difference expression at the time $t_q$,
inputting the extended difference expression at the time $t_q$ to a correction unit to perform correction to rewrite a portion of a tensor representing the extended difference expression at the time $t_q$ to zero,
adding a restoration expression of the learning image data at the time $t_{q-1}$ and noise to the extended difference expression at the time $t_q$ after the correction to generate a restoration expression of learning image data at the time $t_q$,
decoding a restoration expression of the learning image data at the time $t_q$ by an image decoder to generate restored image data at the time $t_q$,
calculating a restoration error between the restored image data at the time $t_q$ and the learning image data at the time $t_q$, and
repeating adjusting a weight of a neural network representing the image encoder, the difference encoder, the correction unit, and the image decoder until the restoration error satisfies a predetermined criterion, and
the difference expression extraction unit extracts a portion, that is to be rewritten to zero by the correction unit, of a tensor representing the extended difference expression as the difference expression.

(5)

The information processing system according to (3) or (4), further comprising:
a correlation region extraction unit that extracts a region where the difference expression at the time $t_k$ and the operation amount data at the time $t_k$ are correlated with each other as a correlation region at the time $t_k$, wherein
the mirror surface region identification unit identifies the mirror surface region based on correlation regions at the plurality of times.

(6)

The information processing system according to (5), wherein
the correlation region extraction unit binarizes each component of a tensor indicating the correlation between the difference expression at the time $t_k$ and the operation amount data at the time $t_k$, and extracts one or more components converted into a value of one as the correlation region at the time $t_k$, and wherein
the mirror surface region identification unit extracts, as a true correlation region at the time $t_k$, one or more components at a position superimposed on or adjacent to a correlation region at a time $t_{k-1}$ immediately before the time $t_k$ among the one or more components extracted as the correlation region at the time $t_k$, and integrates true correlation regions at the plurality of times to identify the mirror surface region.

(7)

The information processing system according to any one of (1) to (6), further comprising:
a route search unit that searches for a route such that the object does not move in a direction in which the mirror surface region exists.

(8)

The information processing system according to any one of (1) to (7), further comprising:
a self-recognition unit that recognizes the object existing in the mirror surface region as its own object.

(9)

The information processing system according to (8), further comprising:
an appearance determination unit that determines a current appearance of its own object based on a difference between an appearance of its own object extracted from image data at a current time acquired by the image data acquisition unit and a predefined self-appearance model.

(10)

The information processing system according to (9), further comprising:
a storage device that stores information about the appearance of its own object determined by the appearance determination unit, wherein
the self-recognition unit distinguishes its own object from another object based on the information, of the appearance of its own object, stored in the storage device.

(11)

A learning method executed by a computer, the method comprising a learning process using learning image data of a stationary object at a plurality of times, wherein
the learning process includes
generating a restoration expression of learning image data at a time $t_1$,
inputting learning image data at a time $t_q$ where q is an integer of two or more and a restoration expression of learning image data at a time $t_{q-1}$ immediately before the time $t_q$ to a difference encoder to extract an extended difference expression at the time $t_q$,
inputting the extended difference expression at the time $t_q$ to a correction unit to perform correction to rewrite a portion of a tensor representing the extended difference expression at the time $t_q$ to zero,
adding a restoration expression of the learning image data at the time $t_{q-1}$ and noise to the extended difference expression at the time $t_q$ after the correction to generate a restoration expression of the learning image data at the time $t_q$,
decoding the restoration expression of the learning image data at the time $t_q$ by an image decoder to generate restored image data at the time $t_q$,
calculating a restoration error between the restored image data at the time $t_q$ and the learning image data at the time $t_q$, and
repeating adjusting a weight of a neural network representing the image encoder, the difference encoder, the correction unit, and the image decoder until the restoration error satisfies a predetermined criterion.

REFERENCE SIGNS LIST

1 INFORMATION PROCESSING SYSTEM
101 IMAGE DATA ACQUISITION UNIT
107 DIFFERENCE ENCODER
108 DIFFERENCE EXPRESSION EXTRACTION UNIT
110 CORRELATION REGION EXTRACTION UNIT
111 MIRROR SURFACE REGION IDENTIFICATION UNIT
112 ROUTE SEARCH UNIT
113 SELF-RECOGNITION UNIT
114 APPEARANCE DETERMINATION UNIT
109 DRIVE AMOUNT DATA ACQUISITION UNIT (OPERATION AMOUNT DATA ACQUISITION UNIT)
170 STORAGE DEVICE
172 SELF-APPEARANCE MODEL
202 IMAGE ENCODER
205 IMAGE DECODER
207 DIFFERENCE ENCODER
208 CORRECTION UNIT

The invention claimed is:

1. An information processing system, comprising:
at least one processor configured to:
acquire operation amount data of an object;
control acquisition of image data from an imaging device mountable on the object, wherein the imaging device captures the image data;
extract, based on two pieces of the image data captured before and after an operation of the object, a specific difference expression that represents first feature information of a difference between the two pieces of the image data; and
identify a mirror surface region based on a correlation between the specific difference expression and the operation amount data.

2. The information processing system according to claim 1, wherein the at least one processor is further configured to:
extract, from the two pieces of the image data, a first extended difference expression including:
the first feature information, of the difference between the two pieces of the image data, caused by a motion of the object, and
second feature information, of a difference between the two pieces of the image data, not caused by the motion of the object; and
selectively extract, from the first extended difference expression, the specific difference expression that represents the first feature information, of the difference between the two pieces of the image data, caused by the motion of the object.

3. The information processing system according to claim 2, wherein the at least one processor is further configured to:
acquire the operation amount data at a plurality of times from a time $t_1$ to a time $t_T$ where T is an integer of two or more;
acquire the image data at the plurality of times, wherein the image data at the plurality of times includes:
first image data corresponding to a time $t_k$, where k is an integer of 2 to T; and
second image data corresponding to a time $t_{k-1}$ immediately before the time $t_k$;
extract, from the first image data at the time $t_k$ and from a restoration expression of the second image data at the time $t_{k-1}$, the first extended difference expression at the time $t_k$;
extract the specific difference expression at the time $t_k$ from the first extended difference expression at the time $t_k$, wherein the difference expression indicates the first feature information caused by the motion of the object; and
identify the mirror surface region based on the correlation between difference expressions at the plurality of times and the operation amount data at the plurality of times.

4. The information processing system according to claim 3, further comprising a neural network in which a weight is optimized by machine learning, wherein
the machine learning includes a learning process based on learning image data of a stationary object at the plurality of times,
the learning process includes:
generation of a first restoration expression of first learning image data at the time $t_1$, extraction of a second extended difference expression at a time $t_q$ based on:
    second learning image data at the time $t_q$ where q is an integer of two or more, and
    a third restoration expression of third learning image data at a time $t_{q-1}$ immediately before the time $t_q$,
correction, to rewrite a portion of a tensor to zero, based on the second extended difference expression at the time $t_q$, wherein the tensor represents the second extended difference expression at the time $t_q$,
addition of the third restoration expression of the third learning image data at the time $t_{q-1}$ and noise to the second extended difference expression at the time $t_q$ after the correction, wherein the addition is to generate a second restoration expression of the second learning image data at the time $t_q$,
decode, by an image decoder, of the second restoration expression of the second learning image data at the time $t_q$ to generate restored image data at the time $t_q$,
calculation of a restoration error between the restored image data at the time $t_q$ and the second learning image data at the time $t_q$, and
repetitive adjustment of the weight of the neural network until the restoration error satisfies a criterion, and
the at least one processor is further configured to extract the portion, that is rewritten to zero, of the tensor that represents the second extended difference expression as the specific difference expression.

5. The information processing system according to claim 3, wherein the at least one processor is further configured to:
    extract a region where the specific difference expression at the time $t_k$ is correlated with the operation amount data at the time $t_k$ as a first correlation region at the time $t_k$; and
    identify the mirror surface region based on correlation regions at the plurality of times, wherein the correlation regions include the first correlation region.

6. The information processing system according to claim 5, wherein the at least one processor is further configured to:
    binarize each component of one or more components of a tensor that indicates the correlation between the difference expression at the time $t_k$ and the operation amount data at the time $t_k$, wherein the binarization converts the one or more components into a value of one;
    extract the one or more components, converted into the value of one, as the first correlation region at the time $t_k$;
    extract, as a true correlation region at the time $t_k$, one or more components at a position superimposed on or adjacent to a second correlation region among the one or more components extracted as the first correlation region at the time $t_k$, wherein the second correlation region is at a time $t_{k-1}$ immediately before the time $t_k$; and
    integrate true correlation regions at the plurality of times to identify the mirror surface region, wherein the true correlation regions includes the true correlation region.

7. The information processing system according to claim 1, wherein the at least one processor is further configured to search for a route to restrict a movement of the object in a direction in which the mirror surface region exists.

8. The information processing system according to claim 1, wherein the at least one processor is further configured to recognize the object in the mirror surface region as an own object.

9. The information processing system according to claim 8, wherein the at least one processor is further configured to determine a current appearance of the own object based on a difference between an appearance of the own object extracted from the acquired image data and a specific self-appearance model.

10. The information processing system according to claim 9, wherein the at least one processor is further configured to:
    store information associated with the appearance of the own object; and
    distinguish the own object from a specific object based on the stored information associated with the appearance of the own object.

11. A learning method, comprising:
in an information processing system:
    controlling an imaging device to capture first learning image data of an object at a time $t_1$;
    setting a plurality of weights of a neural network associated with the information processing system;
    generating a first restoration expression of the first learning image data at the time $t_1$;
    controlling a difference encoder to extract an extended difference expression at a time $t_q$ based on:
        second learning image data at the time $t_q$ where q is an integer of two or more, and
        a third restoration expression of third learning image data at a time $t_{q-1}$ immediately before the time $t_q$;
    executing correction, to rewrite a portion of a tensor to zero, based on the extended difference expression at the time $t_q$, wherein the tensor represents the extended difference expression at the time $t_q$;
    adding the third restoration expression of the third learning image data at the time $t_{q-1}$ and noise to the extended difference expression at the time $t_q$, wherein the addition is to generate a second restoration expression of the second learning image data at the time $t_q$;
    decoding, by an image decoder, the second restoration expression of the second learning image data at the time $t_q$ to generate restored image data at the time $t_q$;
    calculating a restoration error between the restored image data at the time $t_q$ and the second learning image data at the time $t_q$;
    repeating adjusting of the plurality of weights of the neural network until the restoration error satisfies a criterion, wherein the neural network represents the difference encoder, the correction, and the image decoder;
    acquiring operation amount data of the object; and
    identifying a mirror surface region based on a correlation between the extended difference expression and the operation amount data, wherein the extended difference expression represents feature information is associated with the object.

* * * * *